US007307752B1

(12) United States Patent
Mestha et al.

(10) Patent No.: US 7,307,752 B1
(45) Date of Patent: Dec. 11, 2007

(54) ON-LINE CALIBRATION SYSTEM FOR A DYNAMICALLY VARYING COLOR MARKING DEVICE

(75) Inventors: Lingappa K. Mestha, Fairport, NY (US); Peter A. Crean, Penfield, NY (US); Martin S. Maltz, Rochester, NY (US); Robert J. Rolleston, Rochester, NY (US); Yao Rong Wang, Webster, NY (US); Eric Jackson, Webster, NY (US); Thyagarajan Balasubramanian, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 09/566,291

(22) Filed: May 5, 2000

(51) Int. Cl.
G06F 15/00 (2006.01)
H04N 1/46 (2006.01)
G03F 3/08 (2006.01)

(52) U.S. Cl. .......................... 358/1.9; 358/504; 358/518

(58) Field of Classification Search .......... 358/1.1–1.8, 358/1.11–1.19, 1.9, 518, 504, 406, 2.1, 3.22, 358/3.23, 3.24
See application file for complete search history.

(56) References Cited

U.S. PATENT DOCUMENTS

| 4,660,082 A | 4/1987 | Tomohisa et al. ........... 348/615 |
| 4,839,722 A | 6/1989 | Barry et al. |
| 5,448,277 A | 9/1995 | Long |
| 5,530,656 A * | 6/1996 | Six .......................... 702/108 |
| 6,178,007 B1 | 1/2001 | Harrington ................... 358/1.9 |
| 6,281,984 B1 * | 8/2001 | Decker et al. ............... 358/1.9 |

FOREIGN PATENT DOCUMENTS

| EP | 0 747 853 A2 | 12/1996 |
| EP | 0 854 638 A2 | 7/1998 |

OTHER PUBLICATIONS

R. Balasubramanian, "Optimization of the Spectral Neugebauer Model For Printer Characterization", Journal of Electronic Imaging 8(2), 156-166 (Apr. 1999).
R. Balasubramanian, Martin S. Maltz, "Refinement of Printer Transformations Using Weighted Regression", Proc. SPIE, vol. 2658, pp. 334-340, (1966).

\* cited by examiner

*Primary Examiner*—Douglas Q. Tran
(74) *Attorney, Agent, or Firm*—Fay Sharpe LLP

(57) ABSTRACT

A color marking device including a control system for calibration of the device based upon dynamic color balance control of an output image. The system comprises a front end converter for converting an input signal representative of a target image comprising a preselected color into a device-dependent control signal in accordance with a device TRC, a color marking device for outputting an output image in response to the control signal, a sensor for measuring a parameter from the output image representative of a color of the output image, and, a point-wise controller for comparing the parameter with a corresponding parameter from the target image and constructing adjusted controlled points for the device TRC when the measured parameter and the corresponding parameter vary by a preselected value, a color balance controller for constructing an adjusted device TRC from the controlled points, whereby subsequently generated output images are output with the adjusted device TRC and, more accurately represent target input images.

21 Claims, 3 Drawing Sheets

ON-LINE CALIBRATION SYSTEM FOR A DYNAMICALLY VARYING COLOR MARKING DEVICE

FIELD OF THE INVENTION

The subject invention pertains to the art of color management and image/text printing or display systems, and is especially applicable to a method and apparatus wherein a sensor monitors a color print output for on-line construction and/or adjustment of a Tone Reproduction Curve ("TRC") for device operation. More particularly, the invention relates to system controls for calibrating the device by simply monitoring and adjusting color balance for accuracy and by controlling corresponding TRC points. A full color TRC can be accurately estimated from the accurate and controlled TRC points, whereby on-line calibration can be realized in a much more expeditious and efficient manner.

Color correction and/or control should not be confused with color registration systems and sensors for insuring that colors are positioned properly, printed accurately, superposed correctly and/or adjacent to one another.

BACKGROUND OF THE INVENTION

In today's business and scientific world, color has become essential as a component of communication. Color facilities the sharing of knowledge and ideas. Companies involved in the development of digital color print engines are continuously looking for ways to improve the total image quality of their products. One of the elements that affects image quality is the ability to consistently produce the same quality image output on a printer from one day to another, from one week to the next, month after month. Users have become accustomed to printers and copiers that produce high quality color and gray-scaled output. Users now expect to be able to reproduce a color image with consistent quality on any compatible marking device, including another device within an organization, a device at home or a device used anywhere else in the world. There has been a long felt commercial need for efficiently maintaining print color predictability, particularly as electronic marketing has placed more importance on the accurate representation of merchandise in illustrative print or display media.

Description of color, color perception and psychological and physiological phenomena involving light, object and observer, including color measurements using spectrophotometers are described in R. W. G. Hunt, "The Reproduction of Color in Photography, Printing and Television", Fourth Edition, Fountain Press, Tolworth, England 1987 ISBN 0-8524-2356.

The functional models presented in this specification use a device independent color space to consistently track a set of target colors. L*, a*, b* are the CIE (Commission Internationale de L'éclairage) color standards utilized in the modeling. L* defines lightness, a* corresponds to the red/green value and b* denotes the amount of yellow/blue, which corresponds to the way people perceive color. A neutral color is a color where a*=b*=0.

Over time, the output of conventional marking devices drift (or deviate from predetermined optimum standards) due to various factors. These factors include environmental conditions (temperature, relative humidity, etc.), use patterns, the type of media (e.g., different paper types and paper batches, transparencies, etc.) used, variations in media, variations from original models used in initialization, general wear, etc. When a marking device is originally initialized, and at regular or irregular intervals thereafter, it is calibrated and characterized to produce output as close as possible to a reference standard. The full calibration and characterization process, however, is time consuming and expensive, particularly because specific expertise is required.

As an example, calibration and characterization of a conventional four-color (cyan, magenta, yellow and black) printer or copier involves at least the following processes: (1) generating a 3D look-up table (LUT) for mapping device independent parameter space to CMY (cyan-magenta-yellow) space; (2) executing a GCR (gray component replacement)/UCR (under color removal) strategy to convert the CMY space parameters to CMYK space parameters which represent the colors of a typical four-color marking device; (3) constructing marking device TRCs (tone reproduction curves) to account for marking device variabilities (normally done at the time of manufacturing or wherever the printer calibration and characterization process is involved); and (4) applying a suitable half-toning strategy to convert the CMYK continuous tone description obtained after using the 3D LUTs in steps 1 and 2 above and 1LUTs in step 3 above, to the image, to a binary description (e.g., bits to be received by a raster output scanner or similar device for outputting the image). The first two steps are generally grouped under printer characterization. The third step is normally called calibration for the purpose of the subject invention.

In processing the image, the critical step that accounts for variations in marking device output is TRC construction. TRCs are stored plots of an input parameter value versus an output parameter value for a particular color. A TRC is a monotonically increasing marking device function in input-output contone space or input-output density space or input-output byte space, or combinations thereof. In other words, a TRC indicates the value of the output parameter for a specific device that must be used to reproduce the input parameter (if the input and output parameters are exactly equal, then the inputs and outputs are expressed in the same coordinate space). Inaccuracies in the TRC construction step can lead to inaccuracies in color balancing and the 3D LUT.

Obtaining TRCs for a particular color marking engine is a calibration process, which can be constructed by printing predetermined target colors and measuring the printed target colors using insitu color sensors. Predetermined target colors can be printed as chronological jobs in the banner sheet/header sheet or else the target colors can be extracted from the customer image and measured either by measuring straight from the output image or by rendering subsets of customer colors as target color patches in banner and header pages. (c.f. copending Xerox application D/99511Q1—L. K. Mestha, inventor, for a control system using dual mode banner color test sheets, herein incorporated by reference.) Using the target colors and their measured counterparts, and by processing the measured colors, TRCs are adjusted on-line at some desired intervals or on request during system or color balance set ups.

Generally, obtaining 1D TRCs is associated with achieving neutral gray balance. Grayness is an indication of how "clean" a process color is, compared to its theoretical ideal. Good gray has zero chroma [that ,s a*=0=b*]. When equal amounts of cyan, magenta and yellow are printed on a white paper, a well balanced printer should produce a neutral gray of the same amount. Instead, a brownish color rather than a neutral gray may regularly occur. The system will not produce the desired gray due to various limitations on color pigments of the primaries and the internal processes of the print engine. To overcome this effect, gray balanced TRCs are used as one-dimensional LUTs to modulate the amount of cyan, magenta and yellow proportions depending on the state of the materials and the print engine. The TRCs are obtained by printing large number of patches, mostly near neutral. In the methods practiced by the color reproduction industry, colors are measured using offline spectrophotometers and measured quantities are then modified, generally, by using model based algorithms to produce the desired gray balanced TRCs. Usually this process of printing and producing TRCs is iterated several times until satisfactory results are obtained. This type of approach is time consuming and expensive due to the use of machine models and offline spectrophotometer hardware.

The subject invention is particularly useful to provide solutions to the foregoing color problems for a wide range of color workflow practices. Printing and product enhancements are provided that would enable customers to manipulate color documents on a screen before even printing/displaying an output on different output devices in ways that improve the productivity of a current workflow by taking advantages of output color sensors constructed within the printing devices.

The subject invention exploits a key enabling factor for these operational advantages by constructing the TRCs for individual primaries with implementation of merely a limited dynamic color balanced control system for automatic calibration of a full color digital printing system.

BRIEF SUMMARY OF THE INVENTION

In accordance with the present invention there is provided a method and apparatus for quickly and economically calibrating a dynamically varying color reproduction device utilizing a spectrophotometric device for comparing a device output from intended target input images. The target input images could be any colors, and preferably comprise a range of pure black ("K") luminescence or a range of neutral grays. A spectrophotometric sensor measures the output signal to determine a relative device independently color space match between the output image and the input target with respect to both K matching and CMY matching. The error is determined between the measured target colors of the test image and the intended target colors. Tonal Reproduction Curves of the device are adjusted in accordance with the determined error to construct a set of desired and accurate controlled points for the TRC. A full color CMYK TRC is constructed from the controlled points for calibrating the device color output more expeditiously and efficiently, with clearly acceptable results.

In accordance with another aspect of the present invention, the sensor is disposed on line for real time construction of the full color TRCs merely by measuring color patches on test sheets or banner pages. The adjusting of the device TRCs are recursively effected until detected error between measured colors and predetermined target colors diminishes to less than a predetermined value.

In accordance with another aspect of the present invention, the device TRC is adjusted in accordance with a two-step process. First, the sensing of black ("K") test patches is performed for the construction of a K-TRC. Second, the sensing of CMY test patches is performed for the construction of CMY-TRCs. These curves are combined to form a CMYK-TRC used in a digital front end of a marking device.

One advantage obtained by the use of the present invention is a dynamic color balance control system which can automatically calibrate digital printing systems in an easier and faster manner than prior known systems. The calibration processes obviates operator assistance.

Another advantage of the subject invention is that the control system produces device TRCs using closed-looped control and sensing methods for especially maintaining consistent neutral gray colors. As a result, any printing system incorporating the subject invention substantially reduces the frequency requirements of full blown characterizations.

Other benefits and advantages for the subject new methods and systems will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings, which form a part hereof and wherein.

DESCRIPTION OF THE PREFERRED EMBODIMENTS

Figure 1:
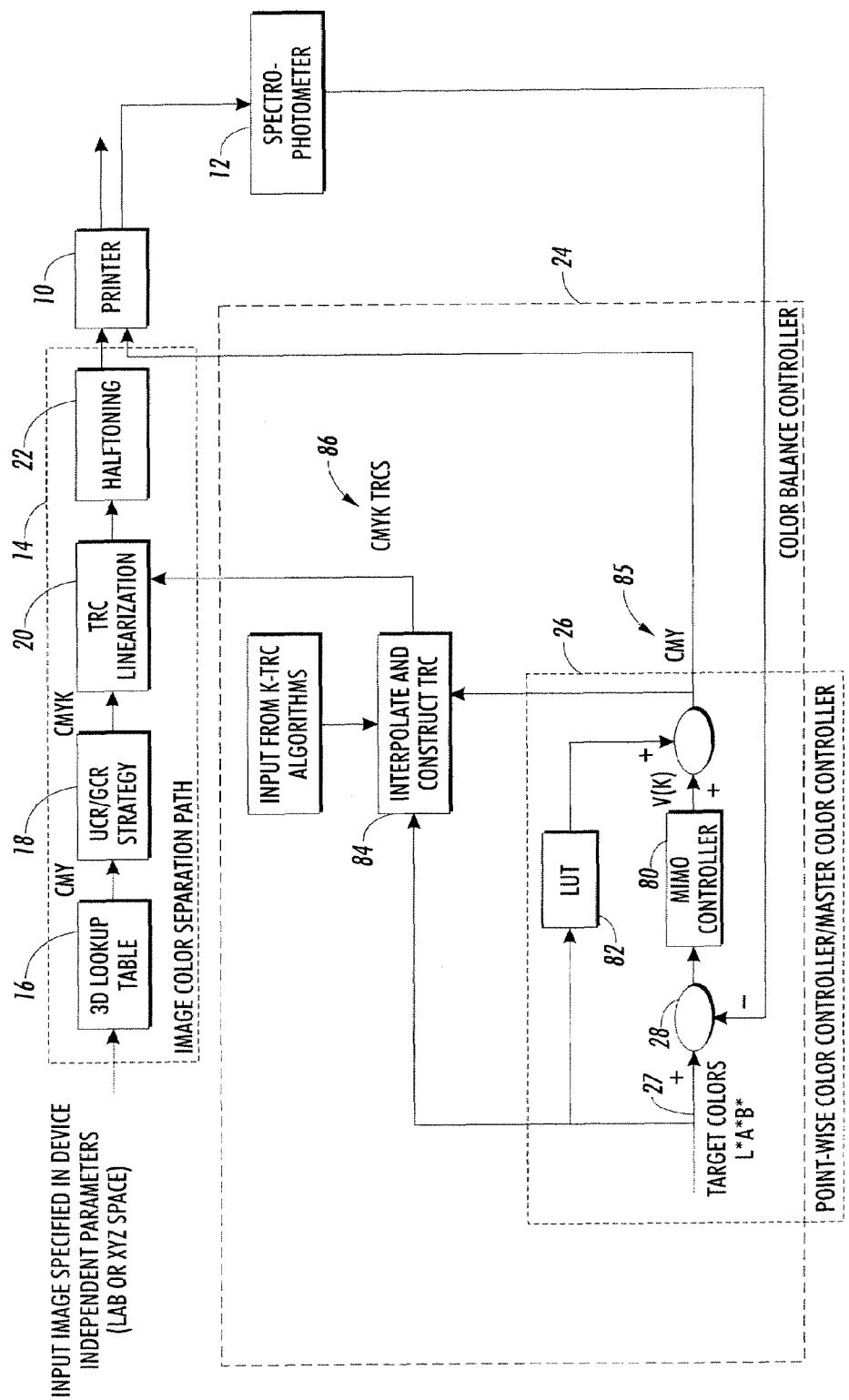
FIG. 1 is a schematic block diagram particularly illustrating the system implementation of color control algorithms for calibrating a TRC for a color printer.

Referring now to the drawings wherein they are shown for purposes of illustrating the preferred embodiments of the invention only and not for purposes of limiting same, the Figures show a method and apparatus for automatically calibrating a digital printing system utilizing a limited dynamic color balance control system. The invention uses an on-line spectrophotometer color measurement system in the output path of a color printer for measuring colors on printed test sheets/banner pages without requiring any manual operations or operator involvement. The automatic color balance control system produces tone values for all four of the primary colors by printing patches, measuring colors and automatically readjusting the tone reproduction curves until a satisfactory level of accuracy is obtained. While producing color balanced TRCs, the system will automatically lock the printer output to some predetermined color patch targets. In one particular preferred embodiment, this output is locked to neutral gray when target colors are set to neutral gray inside the digital front end (DFE). After converging to the targets, the control system will return full TRCs for use inside the normal print path. The process is enabled either by the system controller or by the user with minimal intrusion. The control system uses innovative control algorithms to achieve greater accuracy in the presence of uncertainties in the printing system.

FIG. 1 depicts a block diagram representation of the overall system of the subject invention. The printer specified in the system comprises a marking device 10 and a color sensing device 12, although the invention is not restricted to marking devices alone and any image reproducing/displaying system such as printers, monitors or other imaging devices are intentionally included. In this application, the color sensing device 12 is a spectrophotometer. The spectrophotometer provides spectral information comprising a representative signal of the printed colors of the image and preferably comprises L*, a*, b* values, XYZ, Luv, etc., values depending on the desired color description (c.f. copending Xerox application D/99511-Fred F. Hubble, III and Joel A. Kubby for a detailed description of such a spectrophotometer, herein incorporated by reference.) For this description, only L*, a*, b* coordinate space values are used for describing color.

The digital front end (DFE) 14 comprises a conventional image color separation path for processing an input image as specified in device independent parameters into CMYK printing parameters acceptable by the printer 10. A 3D LUT 16 transforms the original image in device independent space to CMY space. The CMY space is transformed to CMYK space by undercolor removal/gray component replacement 18. Linearization of the Tone Reproduction Curve (TRC) 20 comprises a calibration and characterization process which is the subject of the present application. The particular linearized signal resulting from the TRC is converted into a halftone imaging before actual printing by the marking device 10.

In most cases, re-RIPping (Raster Input Processing) of the images is not required when the color balance can be achieved by merely adjusting the TRCs. It is a feature of the subject invention to achieve a particular output image color balance, and therefore more accurate output printing, by producing color balanced TRCs at convenient and desirable times (typically during preset intervals like the beginning of a job or throughout long jobs as periodically needed to maintain accuracy) to ensure that the requested colors can be produced. These TRCs are generated by printing mixed color patches of specified target patches that are neutral, instead of printing patches with primary colors—CMYK. The RIPped image can then be processed with color balanced TRCs easily inside the DFE 14 for facilitating the use of reprinting RIPped jobs without going through a costly and time consuming re-RIPping process.

With continued reference to FIG. 1, the processing system of the subject invention comprises a Color Balance Controller 24 including a point-wise controller/master color controller 26 for constructing the calibration TRCs. The detailed construction of the TRCs within a front end conversion process is primarily effected in two steps: (1) the K-TRC and then (2) the CMY-TRCs.

Figure 2:
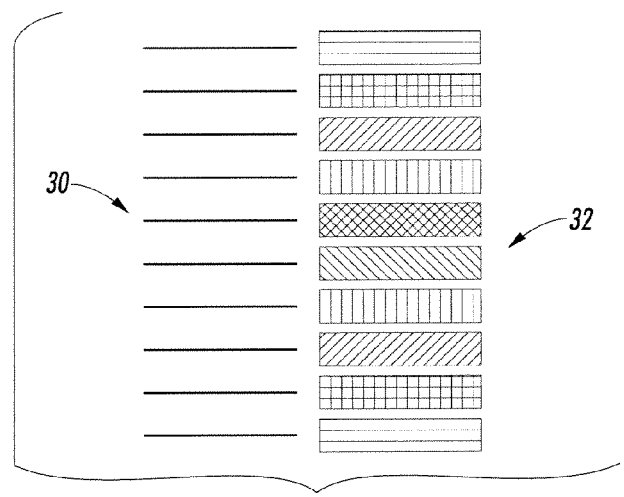
FIG. 2 is a test pattern for building a K-TRC.
Figure 3:
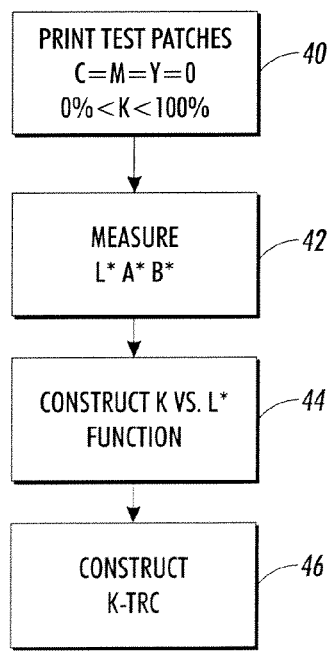
FIG. 3 is a flowchart illustrating steps in constructing a K-TRC utilizing test patches of a varying K.

With particular reference to FIGS. 1, 2 and 3, FIG. 2 illustrates a test pattern for building the K-TRC. The test pattern comprises a plurality of fiducial marks 30 which are read by a fiducial mark sensor (not shown) to create trigger signals for the test patches 32 for the measuring of output images generated by the printing device 10 in response to the input test pattern, wherein the printing 40 of the patches is intended in the subject example, to be in varying degrees of gray, i.e., a*=b*=0, and K between 0 to 100%. Other colors could also be used such as the colors near neutral gray with chroma grater than zero. Although FIG. 2 only illustrates ten patches, a varying number of patches or test pages can, of course, be used. The color L*, a*, b* values of the output patches are measured 42 by the sensor 12 using the input K values of the input test target data and the measured L* values (a* and b* values are discarded from this measurement since the inaccuracies caused by dropping a* and b* values are taken care of by the CMY-TRCs). A smooth one-dimensional input K to L* function can be constructed 44. Construction of the K-TRC is accomplished for calibrating the output K neutral grays to the desired target input neutral grays by inverting the determined function around the linear 45 degree line between input K and output L*. Such inversion is required to linearize the printing system for producing reasonably good black. The exact shape of the K-TRC, especially near the endpoints, can be altered to suit any particular customer's need using any of several data smoothing and normalization algorithm, well known to those of ordinary skill in the art.

Figure 4:
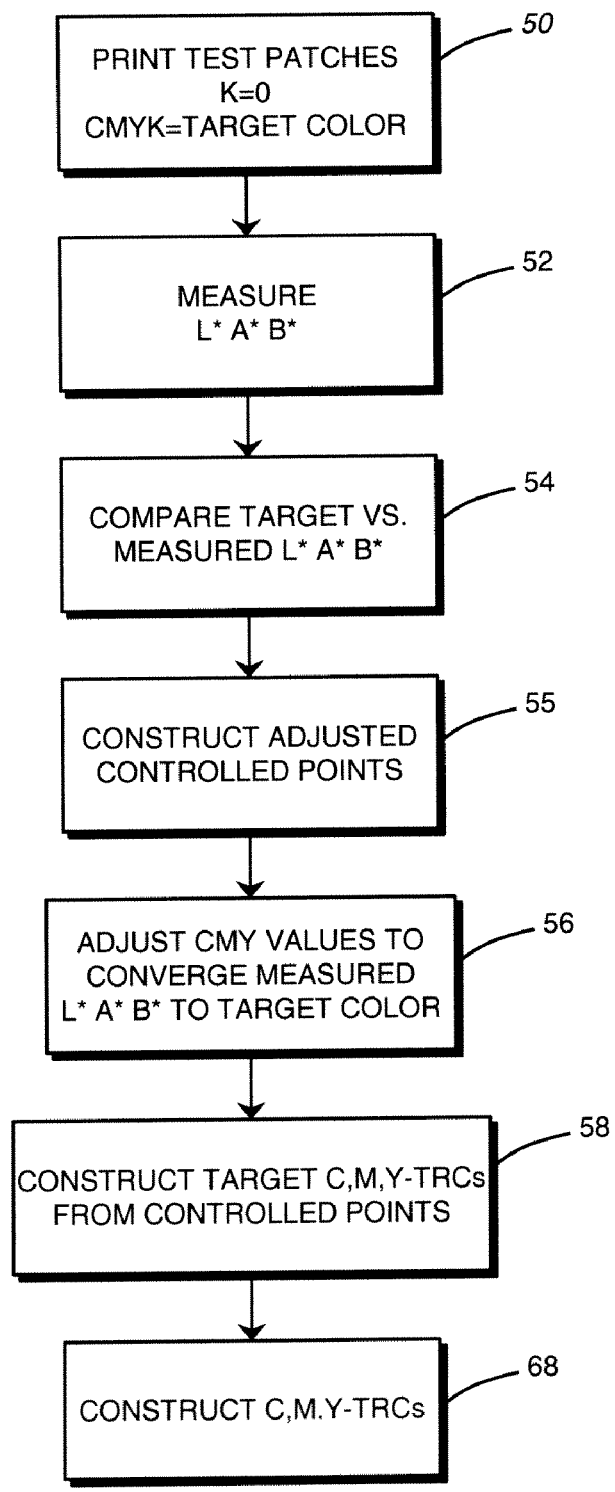
FIG. 4 is a flowchart illustrating the steps for building a CMY-TRC.

With continued reference to FIGS. 1 and 4, the construction of the CMY-TRCs is slightly more complicated. The point-wise closed-loop color controller 26 is used to obtain C,M,Y-TRCs from similar test target patterns to that illustrated in FIG. 2 except that the test patterns comprise patches having K equal 0 and a preselected number of mixed color patches with appropriate CMY values. The desired CMY values are determined iteratively by using the subject color algorithm to track the target color patches shown by the input arrows 27. The particular problem in the CMY-TRC construction process is that the measured (step 52) L*, a*, b* comprise a measurement of three parameters (not just the one as in K-TRC construction); however, conceptually for a neutral gray, a*=b*=0, so one can simplify a curve correction from a three parameter three-dimensional lookup table to a set of three one-dimensional adjustment curves. In other words, after constructing adjusted controlled points 55 and for example, for a neutral gray output having an L* value of 50, one can normally assume that C=M=Y=50 (on a scale related to, but not equal to, L*,) and the measured value should be L*=50 and a*=b*=0. When an actual output has a* and b* values for a target neutral gray, the color values need to be adjusted through the subject closed loop control system to generate the appropriate neutral gray output, which in this example, would be L*=50. In this case, for example, the C, M and Y could be adjusted to values other than 50 to accommodate the particular printing operation of the subject printing device so that the eventual output would essentially achieve some CMY mix which would have a neutral gray output of L*=50 for the particular printer 10. The comparison (step 54) of the target test patches with the measured values of the printer output from sensor 12 are compared at comparator 28, and the difference transformed with a multi-input, multi-output controller 80 for outputting a transformed error vector. The input representing the target colors (again, in this particular example, L* values are between 0 to 100 and a* and b* values are equal to zero) is also fed to a look-up table 82. This look-up table could be an approximate inverse of the printer (i.e., L*, a*, b*→CMY) or simply L*=C=M=Y. Using the output of the look-up table, first prints of the patches are made. At the summing node 28 the input target values are then compared to the measured colors to obtain the error. The output of the first summing node is an error signal representing the difference between the desired target color and the output color which is fed as an output to a gain matrix K within controller 26 and then that output is processed through an integrator. The integrator integrates the weighted errors and outputs corrections to the value that is the output from the look-up table. If we assume k as the iteration step, the equations solved by the integrator and the gain matrix for each controlled point [single color] are respectively;

$$V_i(k)=V_i(k-1)+U_i(k)$$

$$U_i(k)=K_i E_i(k)$$

Where $$E_i(k)=[L^*{}_i{}^t-L^*{}_i{}^m \ a^*{}_i{}^t-a^*{}_i{}^m \ b^*{}_i{}^t-b^*{}_i{}^m]^T$$

$K_i$ is an ith matrix of dimensions 3×3

$L^*{}_i, a^*{}_i, b^*{}_i \ldots$ are color values of ith number of patches with i=color patch l numbers between 1 to _N $V_i(k)$ is a function of the delta for C, M, Y values t indicates target values, m indicates measured values and T indicates matrix transpose.

The matrix $K_i$ is predetermined from a first set of input-output characterization of the printer for each control point and is stored in a memory (not shown) of the controller 26.

The L*, a*, b*→CMY values are used inside the "interpolate and construct TRC" block 84 to build smooth 1D TRC functions. Since the point-wise controller does not work very well at the gamut boundaries, it will be desirable to include new ways to shape the TRCs at the boundaries of the TRCs. The desired final shape or response of CMY-TRCs to cause the color image to print correctly is an option not shown in the Figures. The current embodiment makes these approximately linear in L*, with some appropriate smoothing near the boundaries for adjusting highlight and shadow colors.

The iterative process of adjusting (step 56) CMY values 85 to converge from the corresponding measured output L*, a*, b* values to target colors, generates the set of controlled points for a CMY-TRC which accurately represent a device 10 operation. The CMY-TRCs are then constructed from the controlled points by the mapping of target colors (L*, a*, b* to CMY), in particular when neutral gray colors are used as target colors, mapping of input L* to CMY values, from the acceptable iterations for accurate and desired points on the TRC curves. Iterations can occur until the detected differences by comparator 28 between the target values and actual output values are less than a predetermined value. The construction (step 68) of a full color and fully calibrated CMYK-TRC is also effected by processing block 84 through the compilation of the controlled points from the previously constructed K-TRC and the controlled points of the CMY-TRC. Uncontrolled points that are in between the control points are constructed using well known linear interpolation techniques.

The fully constructed CMYK-TRCs 86 are provided to the digital front end 14 of the system 4 implementation as calibrated and accurate TRCs of the device.

This technology is also applicable to construct TRCs for printing systems with more than four primary colors, such as liquid ink printing systems utilizing custom colors having a greater range of primary colors than most conventional systems.

What has been disclosed is a technique for controlling the color automatically and accurately, in particular, by referencing the control of neutral gray, by using insitu color sensing and closed loop control algorithms. When implemented, it enables the automatic generation of TRCs which are applied to images inside the DFE. Different inks, variability in manufacturing, tribo, slight changes in media temperature, humidity, etc. (caused due to zonal differences) can lead to unacceptable print quality. The proposed method of on-line computation of the TRCs can fix this problem—without even a user/customer knowing it. The control procedures are executed on-line at a user's discretion, through banner pages, or periodically at some predetermined intervals to produce corrected CMYK-TRCs so that the colors are maintained to within acceptable limits.

Although the above has described the use of a spectrophotometer, it could also be used in a colorimeter, which uses only three light sources and can therefore be considered a defeatured, low accuracy and lowest possible cost spectrophotometer.

The invention has been described with reference to the preferred embodiment. Obviously, modifications and alterations will occur to others upon a reading and understanding of the specification. It is our intention to include all such modifications and alterations insofar as they come within the scope of the appended claims or the equivalents thereof.

Having thus described our invention, we now claim:

1. A method for calibrating a dynamically varying color reproduction device from an output image generated in response to a target test including steps of:
    producing an image with the device in response to an input signal from the test target wherein the test target comprises a preselected neutral gray color;
    measuring with a sensor an output signal representative of the output image corresponding to the target preselected color;
    determining an error between the output signal of the image and the input signal;
    adjusting a tone reproduction curve (TRC) of the device to minimize the determined error for a plurality of preselected colors only wherein the plurality include C, M and Y values of preselected neutral gray colors, and wherein a set of desired controlled points corresponding to values of a plurality of test targets on the TRC are formed; and,
    constructing a full color TRC for the device from the controlled points for calibrating the device color output comprising adjusting a set of three one-dimensional TRCs wherein each of the TRCs corresponds to a one of the C, M and Y values, whereby the device is expeditiously calibrated by iterating the adjusting for the plurality of preselected colors until the error is less than a predetermined value and the TRC adjustment avoids connecting a three parameter three-dimensional look up table in favor of the set of three one-dimensional adjustment TRCs.

2. The method as defined in claim 1 wherein the device includes the sensor on-line and the constructing comprises in real time operating of the device from measuring the preselected colors on test sheets or banner pages.

3. The method as defined in claim 1 wherein the adjusting comprises recursively determining the error for a predetermined number of iterations.

4. The method as defined in claim 1 wherein the constructing comprises interpolating uncontrolled points between the controlled points.

5. The method as defined in claim 1 wherein the adjusting comprises the sensing of black K test patches for the constructing of a black K-TRC.

6. The method as defined in claim 5 wherein the adjusting further comprises the sensing of neutral gray CMY test patches for the constructing of a gray-balanced CMY-TRC.

7. The method as defined in claim 6 wherein the sensing of the neutral gray CMY test patches comprises arranging K=0 and printing a number of mixed color patches with appropriate CMY values.

8. The method as defined in claim 7 wherein the adjusting comprises the sensing of L*, a*, b* values of the test patches and adjusting a digital front end (DFE) of the device with new CMY values for generating the target neutral gray color.

9. The method as defined in claim 8 wherein the adjusting comprises mapping the TRC controlled points with a point-wise controller of a color balance controller.

10. A color marking device including a control system for calibration of the device based upon dynamic color balance control of an output image, the system comprising:
    a front end converter for converting an input signal representative of a target image comprising a preselected neutral gray color into a device-dependent control signal in accordance with a device TRC;

a color marking device for outputting an output image in response to the control signal;

a sensor for measuring a parameter from the output image representative of a color of the output image; and, a point-wise controller for comparing the parameter with a corresponding parameter from the target image and constructing adjusted controlled points for three on-dimensional TRCs representative of C, M and Y values comprising a plurality of preselected colors for the device full color TRC when the measured parameter and the corresponding parameter vary by a preselected value by iterating the constructing of the adjusted controlled points until the preselected value comprises an acceptable error, a color balance controller for constructing an adjusted full color device TRC from the controlled points, whereby subsequently generated output images are output with the adjusted full color device TRC and, more accurately represent target input images.

11. The system as defined in claim 10 wherein the color balance controller further constructs the adjusted device TRC with uncontrolled points estimates from the controlled points.

12. The system as defined in claim 11 wherein the sensor is disposed on-line for real time adjustment of the device TRC.

13. The system as defined in claim 12 wherein the point-wise controller comprises controlling black K test patches for the constructing of a black K-TRC.

14. The system as defined in claim 13 wherein the point-wise controller comprises controlling neutral gray test patches for the constructing of a gray-balanced CMY-TRC.

15. A system for on-line calibrating a color marking device by dynamic color control of predetermined color test patches, comprising:

an on-line sensor for detecting a parameter directly relating to and representing a colorimetric value of an output image from the device corresponding to an input predetermined color test patch;

a point-wise controller for determining unacceptable limits between the detected parameter and a corresponding parameter of the input predetermined color test patch and for constructing controlled points for the marking device relatively adjusting a control signal representing the corresponding predetermined color test patch, wherein a subsequent output image matches the test patch within acceptable limits; and, a color balance controller for constructing a full color device TRC from a set of three one-dimensional TRCs representative of C, M and Y values comprising the controlled points whereby the device is full color calibrated by real time constructing of the full color device TRC by iterating the adjusting of the controlled points until the parameters acceptably match.

16. The system as defined in claim 15 wherein the point-wise controller constructs the controlled points for comprising a one-dimensional TRC.

17. The system as defined in claim 16 wherein the color balance controller utilizes the controlled points for interpolating and constructing a plurality of uncontrolled points, the controlled and uncontrolled points being compiled to form the one-dimensional TRC.

18. The system as defined in claim 17 wherein the color balance controller constructs a plurality of CMYK TRCs from a plurality of the one-dimensional TRCs.

19. The system as defined in claim 18 wherein the predetermined color comprises a neutral gray.

20. The system as defined in claim 15 wherein the predetermined color comprises a multiple primary color for printing.

21. The system as defined in claim 15 wherein the point-wise controller includes a gain matrix K and an integrator for solving the equations $$V_i(k)=V_i(k-1)+U_i(k)$$

and $$U_i(k)=K_i E(k)$$

wherein $$E_i(k)=[L^{*t}_i-L^{*m}_i \ a^{*t}_i-a^{*m}_i \ b^{*t}_i-b^{*m}_i]^T,$$

$K_i$ is an ith matrix of dimensions 3×3, $L^*_i, a^*_i, b^*_i$ ... are color values of ith number of patches with i=color patch numbers between 1 to N, t indicates target values, m indicates measured values and T indicates matrix transpose.

* * * * *